United States Patent [19]

Chen

[11] Patent Number: 4,984,761
[45] Date of Patent: Jan. 15, 1991

[54] ELECTRIC FAN CROSS-SHAPED BASE

[76] Inventor: Ying-Fu Chen, No. 140-66, Che Lu Chien, Pao An Tsun, Jen Teh Hsiang, Tainan Hsien, Taiwan

[21] Appl. No.: 475,536

[22] Filed: Feb. 6, 1990

[51] Int. Cl.⁵ ............................................. F16M 11/00
[52] U.S. Cl. .................................. 248/188.7; 248/165; 248/431
[58] Field of Search ................... 248/188.7, 164, 163.1, 248/165, 431; 108/150

[56] References Cited

U.S. PATENT DOCUMENTS

| | | | |
|---|---|---|---|
| 3,188,033 | 6/1965 | Groves | 248/188.7 |
| 3,588,015 | 6/1971 | Bereday | 248/188.7 X |
| 4,653,710 | 3/1987 | Dickison | 248/188.7 |
| 4,789,122 | 12/1988 | Gutgsell | 248/188.7 |

*Primary Examiner*—Alvin C. Chin-Shue
*Attorney, Agent, or Firm*—Varndell Legal Group

[57] ABSTRACT

An electric fan cross-shaped base comprising a round base body and a plurality of horizontal feet removably assembled with the base body so as to save packing cost and freight.

2 Claims, 4 Drawing Sheets ically extending hole formed through the inner end thereof, said base having a plurality of bolt holes formed therein and opening in a downward direction, and a bolt extending through the hole in each of said feet and into the associated bolt hole in said base to securely hold the feet to the base, said base including a
ELECTRIC FAN CROSS-SHAPED BASE

BACKGROUND OF THE INVENTION

A conventional electric fan cross-shaped base generally has a structure shown in FIG. 1, which has two rods intersecting each other. Rod 10 has upper groove 101 at the middle and rod 11 has lower groove 111 so that both rods 10 and 11 can be intersectingly fixed with each other as a cross. And both rods 10 and 11 have two threaded holes 12 for bolts to fix upright tube 13 firmly on both rods.

In order to preserve stability of an electric fan, rods 10 and 11 are longer than the width of the fan, and in packing, the fan is first placed in a carton and the rest parts such as rods 10 and 11 are placed at the front or the rear diagonally in the carton so that the carton has to be lengthened in its size, to the result of increased cost for the carton. The carton is square or rectangular but the fan is round, so when the fan is placed in the carton, there is still large empty space around the fan not utilized, and besides, the carton has to be made large enough to contain the rods, making up a waste. Besides, it is also inconvenient that upright tube 13 is combined with rods 10 and 11 with four bolts.

In view of the disadvantages mentioned above, this invention has been devised to improve the cross-shaped base for an electric fan so that it can be easily assembled or taken apart to be packed in a carton as small as possible to save its packing cost.

SUMMARY OF THE INVENTION

This invention comprises a round base body and preferably four horizontal feet and an upright tube.

The base body has preferably four connecting grooves equally spaced apart at the inner peripheral wall abutting to four openings to be fitted by the inner end of the horizontal feet and both kept firmly together by means of T-shaped projecting lips and T-shaped grooves in both and a bolt.

The feet have two T-shaped vertical grooves in both side walls of the inner end to be fitted in by T-shaped projecting lips in the connecting grooves and the openings in the base body, and can be taken off the base body for packing to minimize the dimension of a carton.

The upright tube for supporting the fan is provided with a vertical projecting chip at the lower end and inserted in a central hole in the base body, with the projecting chip fitting in a recess in the peripheral surface of the central hole and a bolt screws in a bolt hole in the base body and in the projecting chip to hold firmly both together.

DETAILED DESCRIPTION OF THE INVENTION

Figure 1:
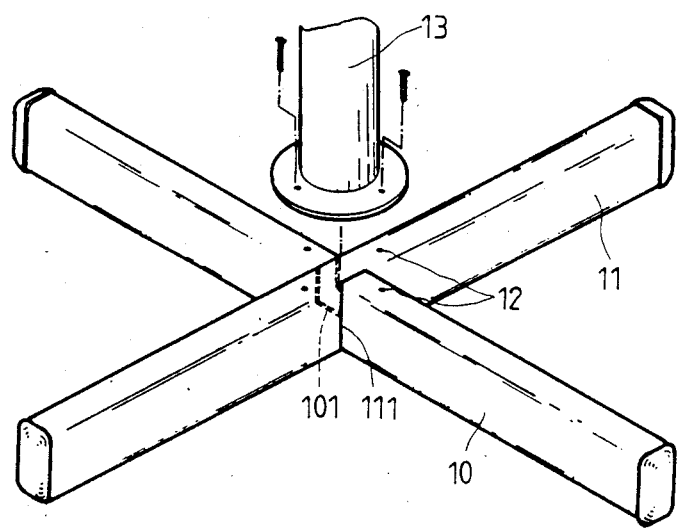
FIG. 1 is a perspective view of a conventional electric fan cross-shaped base.
Figure 2:
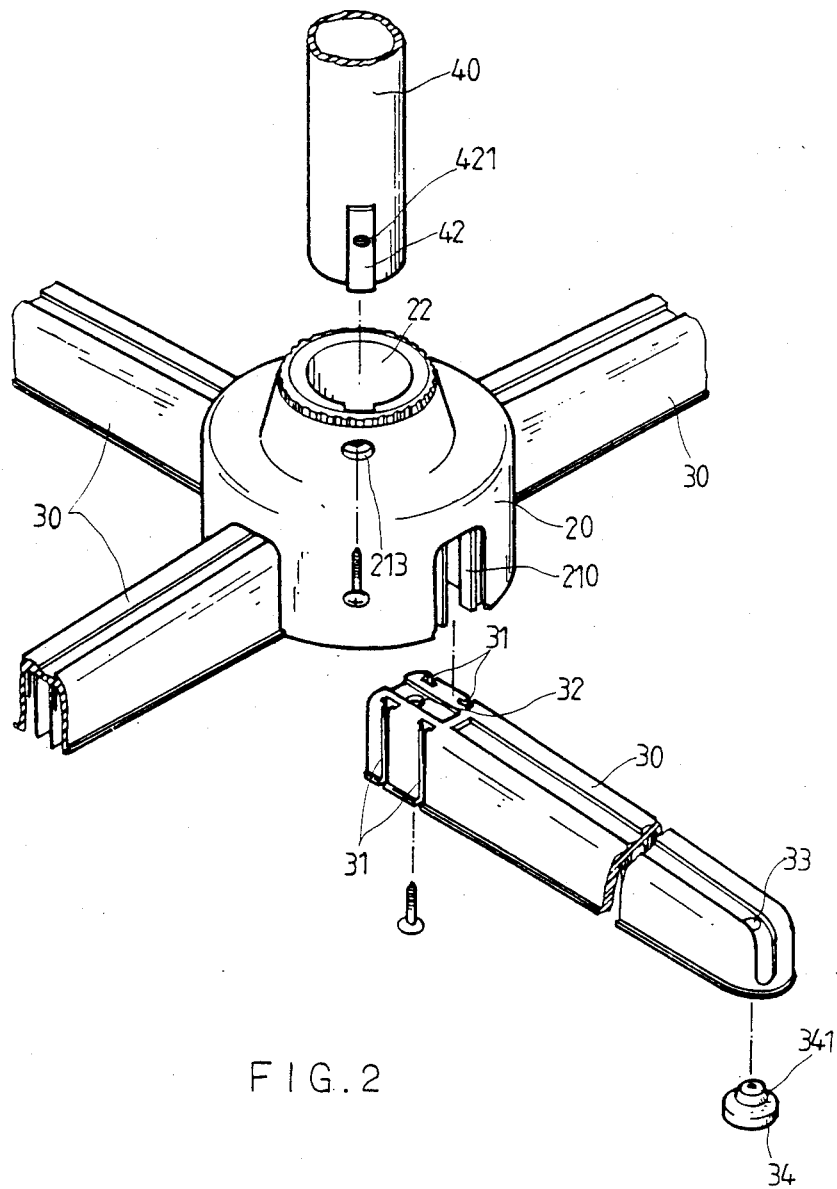
FIG. 2 is an exploded perspective view of the electric fan cross-shaped base in the present invention.

The electric fan cross-shaped base in the present invention comprises base body 20 and a plurality of horizontal feet as main parts, as shown in FIG. 2.

Figure 3:
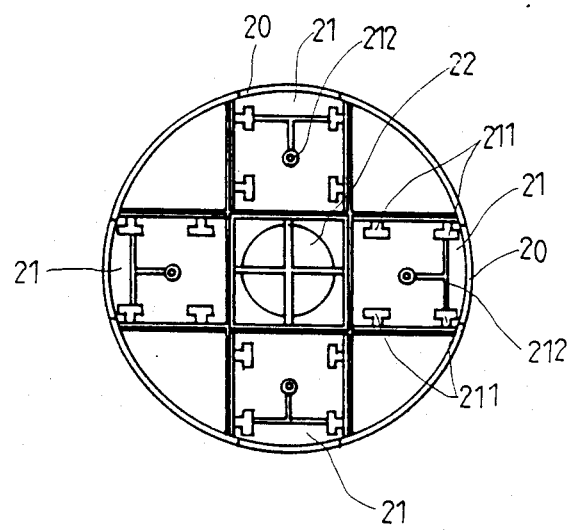
FIG. 3 is a bottom view of the base body in the present invention.

Base body 20, as shown in FIG. 3, is shaped round and provided with a plurality, preferably four, of connecting grooves 21 equally spaced apart at the inner surface, a plurality, preferably four, of openings abutting said grooves 21, two T-shaped projecting lips at both sides of the inner wall surface of said grooves 21, four bolt holes 212 at the upper inner surface of said grooves 21, central through hole 22 for upright tube 40 to insert to support the fan, a rectangular vertical recess in the peripheral surface of central hole 22 and bolt hole 213 in the recess.

Figure 4:
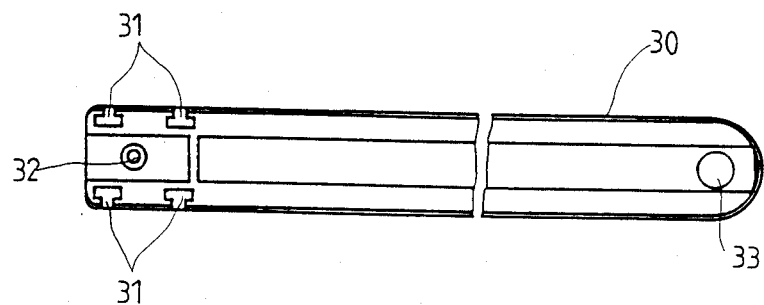
FIG. 4 is a bottom view of the foot in the present invention.
Figure 5:
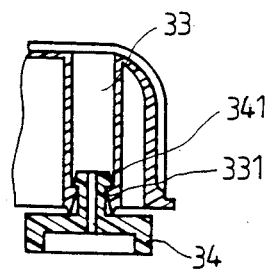
FIG. 5 is a cross-sectional view of the foot fixed with the foot cushion in the present invention.

Four feet 30, referring to FIG. 4, have their inner end fitting firmly in each connecting opening 210 and grooves 21, two T-shaped vertical grooves 31 in both side surfaces engaging with T-shaped projecting lips 211 in said grooves 21, bolt hole 33 at the free end and long ring 331 fitted in said hole 33 for foot cushion 34 to fit in with its upper peripheral edge stuck at projecting inner edge of said ring 331, as shown in FIG. 5.

Figure 6:
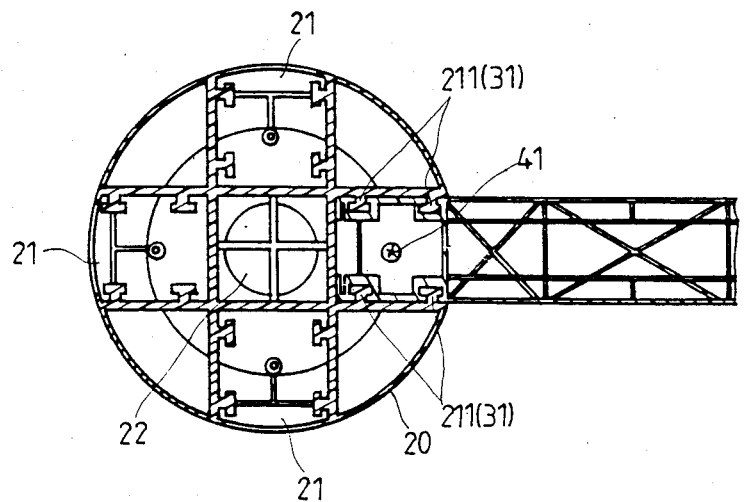
FIG. 6 is a bottom cross-sectional view of the partly combined cross-shaped base in the present invention.

Now, referring to FIG. 6, after foot 30 is combined with base body 20, the outer surface of the inner end of foot 30 firmly engages with the inner surface of opening 210 and connecting groove 21 in base body 2, and T-shaped lips 211 fit in T-shaped grooves 31, and besides, bolt 41 screws both 20 and 30 firmly together. Therfore, in packing, feet 30 can be taken off base body 20 so that the carton needed can be minimized as small as possible, to same packing cost and freight.

Upright tube 40 has projecting chip 42 at the lower end to fit in the recess of central hole 22 and bolt hole 421 in said chip 42 for a bolt to screw through and also through bolt hole 213 to hold firmly upright tube 40 in hole 22. Projecting chip 42 and the recess in central hole 22 are provided to easily screw a bolt in the screw holes in the both.

What is claimed is:

1. A base for supporting an electric fan comprising a body having an outer periphery, a plurality of openings being formed in said outer periphery and extending inwardly thereof for receiving the inner ends of supporting feet, each of said openings including a pair of substantially parallel side walls, said openings being open at the lower ends of said side walls, each of said side walls having a pair of spaced vertically extending lips of substantially T-shaped cross-sectional configuration thereon, a plurality of supporting feet having inner and outer ends, the inner ends of each of said feet including opposite substantially parallel side surfaces, each of said side surfaces having a pair of spaced vertically extending grooves formed therein of substantially T-shaped cross-sectional configuration complementary to that of said lips, so that when in assembled position, each of the lips on the wall of an opening in said body fits within a groove in an associated one of said feet with the side surfaces of each of said feet firmly engaging the side walls of the associated opening, each of said feet having a vertically extending hole formed through the inner end thereof, said base having a plurality of bolt holes formed therein and opening in a downward direction, and a bolt extending through the hole in each of said feet and into the associated bolt hole in said base to securely hold the feet to the base, said base including a central hole opening in an upward direction for receiving a cooperating tube.

2. A base as defined in claim 1 including a tube extending into said central hole in the base, said central hole being defined by a substantially cylindrical surface, said surface having a radially outwardly extending recess formed therein, said tube having a projecting chip thereon fitted in said recess, said chip having an outwardly opening bolt hole formed therein, said base having a hole formed therethrough opening radially into said recess, and a bolt extending through said last-mentioned hole and into the bolt hole in said chip to secure the tube in an upright position in said central hole.

* * * * *